(12) United States Patent
Lan

(10) Patent No.: US 12,206,264 B2
(45) Date of Patent: Jan. 21, 2025

(54) ALTERNATELY CHARGING METHOD, ALTERNATELY CHARGING APPARATUS, AND ALTERNATELY CHARGING TERMINAL DEVICE

(71) Applicant: VIVO MOBILE COMMUNICATION CO., LTD., Guangdong (CN)

(72) Inventor: Yongcheng Lan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 562 days.

(21) Appl. No.: 17/537,392

(22) Filed: Nov. 29, 2021

(65) Prior Publication Data

US 2022/0085619 A1    Mar. 17, 2022

Related U.S. Application Data

(63) Continuation-in-part of application No. PCT/CN2020/089245, filed on May 8, 2020.

(30) Foreign Application Priority Data

May 29, 2019   (CN) .......................... 201910456618.1

(51) Int. Cl.
  *H02J 7/00*      (2006.01)
  *H01M 10/44*   (2006.01)

(52) U.S. Cl.
  CPC ......... *H02J 7/0013* (2013.01); *H01M 10/441* (2013.01); *H02J 7/0047* (2013.01)

(58) Field of Classification Search
  CPC .................................................... H02J 7/0013
  (Continued)

(56) References Cited

U.S. PATENT DOCUMENTS

2015/0214756 A1*  7/2015  Shih ................... H02J 7/007
                                                                 320/112
2016/0028257 A1*  1/2016  Hashimoto ......... H01M 10/482
                                                                 320/112
(Continued)

FOREIGN PATENT DOCUMENTS

CN         103762930 A      4/2014
CN         104079017 A     10/2014
(Continued)

OTHER PUBLICATIONS

International Search Report of International Application No. PCT/CN2020/089245 mailed on Jul. 15, 2020.
(Continued)

*Primary Examiner* — Yalkew Fantu
(74) *Attorney, Agent, or Firm* — IP & T GROUP LLP

(57) ABSTRACT

A charging apparatus includes a charging module, where the charging module is connected to a first terminal of a first selection module; a second terminal of the first selection module is connected to a first terminal of a first battery module, a third terminal of the first selection module is connected to a first terminal of a second battery module, in a case in which a first condition is satisfied, the first terminal of the first selection module is connected to the second terminal of the first selection module, and in a case in which a second condition is satisfied, the first terminal of the first selection module is connected to the third terminal of the first selection module; and a coulometer management module, connected to the first battery module and the second battery module.

20 Claims, 3 Drawing Sheets

(58) Field of Classification Search
USPC .......................................................... 320/126
See application file for complete search history.

(56) References Cited

U.S. PATENT DOCUMENTS

2016/0036250 A1* 2/2016 Cho ..................... H02J 7/0048
320/112
2016/0359341 A1* 12/2016 Huang ................... G04G 19/00

FOREIGN PATENT DOCUMENTS

| CN | 104901373 A | 9/2015 |
| CN | 108365650 A | 8/2018 |
| CN | 109525720 A | 3/2019 |
| CN | 110086229 A | 8/2019 |
| JP | 2013-146129 A | 7/2013 |

OTHER PUBLICATIONS

Written Opinion of The International Searching Authority of International Application No. PCT/CN2020/089245 mailed on Jul. 15, 2020.
First Office Action of Priority Application No. 201910456618.1 mailed on Jun. 2, 2020.
The Second Office Action of Priority Application No. 201910456618.1 mailed on Jan. 6, 2021.
The Third Office Action of Priority Application No. 201910456618.1 mailed on Jul. 2, 2021.

* cited by examiner

ALTERNATELY CHARGING METHOD, ALTERNATELY CHARGING APPARATUS, AND ALTERNATELY CHARGING TERMINAL DEVICE

CROSS-REFERENCE OF RELATED APPLICATIONS

This application is a Bypass Continuation-in-Part Application of PCT/CN2020/089245 filed on May 8, 2020, which claims priority to Chinese Patent Application No. 201910456618.1 filed on May 29, 2019, which are incorporated herein by reference in their entirety.

TECHNICAL FIELD

The present disclosure relates to the field of communications technologies, and in particular, to a charging method, apparatus, and a terminal device.

BACKGROUND

In a dual battery charging solution in a related technology, generally, one battery is fully charged first, and then the other battery is charged. In this manner, for charging a terminal device, that both batteries are fully charged is required for normal use of the terminal device, so that use of the terminal device is affected.

SUMMARY

Embodiments of the present disclosure provide a charging method, apparatus and a terminal device.

According to a first aspect, an embodiment of the present disclosure provides a charging apparatus, applied to a terminal device, including:
  a charging module, where the charging module is connected to a first terminal of a first selection module, and
  a second terminal of the first selection module is connected to a first terminal of a first battery module, a third terminal of the first selection module is connected to a first terminal of a second battery module, in a case in which a first condition is satisfied, the first terminal of the first selection module is connected to the second terminal of the first selection module, and in a case in which a second condition is satisfied, the first terminal of the first selection module is connected to the third terminal of the first selection module; and
  a coulometer management module, connected to the first battery module and the second battery module.

According to a second aspect, an embodiment of the present disclosure further provides a charging method, applied to the charging apparatus in the first aspect, including:
  obtaining a current battery level of a first battery module in the charging apparatus and/or a current battery level of a second battery module in the charging apparatus by using a coulometer management module in the charging apparatus; and
  charging the first battery module or the second battery module based on the current battery level of the first battery module and/or the current battery level of the second battery module.

According to a third aspect, an embodiment of the present disclosure further provides a charging apparatus, applied to a terminal device, including:
  an obtaining module, configured to obtain a current battery level of a first battery module and/or a current battery level of a second battery module;
  a charging module, configured to charge the first battery module or the second battery module based on the current battery level of the first battery module and/or the current battery level of the second battery module.

According to a fourth aspect, an embodiment of the present disclosure further provides a terminal device, including: a memory, a processor, and a computer program stored in the memory and executable on the processor, where when the processor executes the computer program, the steps of the method according to the first aspect are implemented.

According to a fifth aspect, an embodiment of the present disclosure further provides a terminal device, including the foregoing charging apparatus.

According to a sixth aspect, an embodiment of the present disclosure further provides a non-transitory computer-readable storage medium. The non-transitory computer-readable storage medium stores a computer program. When the computer program is executed by a processor, the steps of the method according to the first aspect are implemented.

DESCRIPTION OF THE DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DETAILED DESCRIPTION OF EMBODIMENTS

The technical solutions in embodiments of the present disclosure are described below clearly with more details with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
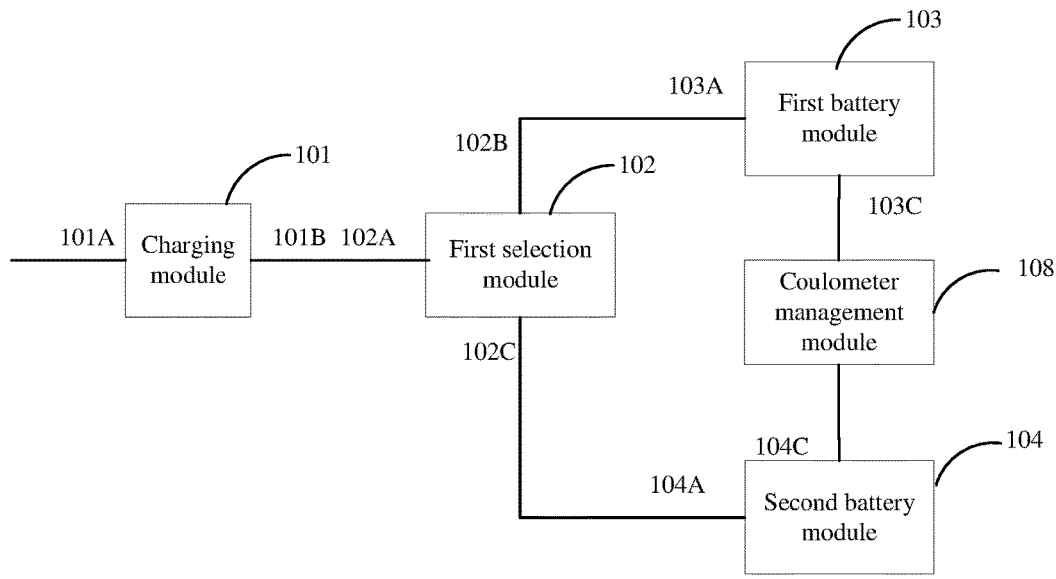
FIG. 1 is a first structural diagram of a charging apparatus according to an embodiment of the present disclosure.

Refer to FIG. 1. FIG. 1 is a structural diagram of a charging apparatus according to an embodiment of the present disclosure. The charging apparatus may be applied to a terminal device. As shown in FIG. 1, the charging apparatus includes:
  a charging module 101, where a first terminal 101A of the charging module may be connected to an external power supply, a second terminal 101B of the charging module 101 is connected to a first terminal 102A of a first selection module 102, and a second terminal 102B of the first selection module 102 is connected to a first terminal 103A of a first battery module 103, a third terminal 102C of the first selection module 102 is connected to a first terminal 104A of a second battery module 104, in a case in which a first condition is satisfied, the first terminal 102A of the first selection module 102 is connected to the second terminal 102B of the first selection module 102, and in a case in which a second condition is satisfied, the first terminal 102A of the first selection module 102 is connected to the third terminal 102C of the first selection module 102; and a coulometer management module 108, separately connected to the first battery module 103 and the second battery module 104.

The first condition is that the first selection module receives a first control signal, and the second condition is that the first selection module receives a second control signal. The two control signals are different control signals or represent different meanings.

In FIG. 1, a current battery level of the first battery module and/or a current battery level of the second battery module are/is obtained by using the coulometer management module. Then, the first battery module or the second battery module is charged based on the current battery level of the first battery module and/or the current battery level of the second battery module.

In the embodiments of the present disclosure, the current battery level of the first battery module or the current battery level of the second battery module is obtained by using the coulometer management module. Then, the first battery module or the second battery module is charged based on the current battery level of the first battery module and/or the current battery level of the second battery module. Therefore, in the embodiments of the present disclosure, there is no need to wait for a fully charged battery before another battery can be charged, but the first battery module and the second battery module can be charged alternately. Therefore, the solution of the embodiments of the present disclosure can satisfy a requirement of a user on using a terminal device in time.

Figure 2:
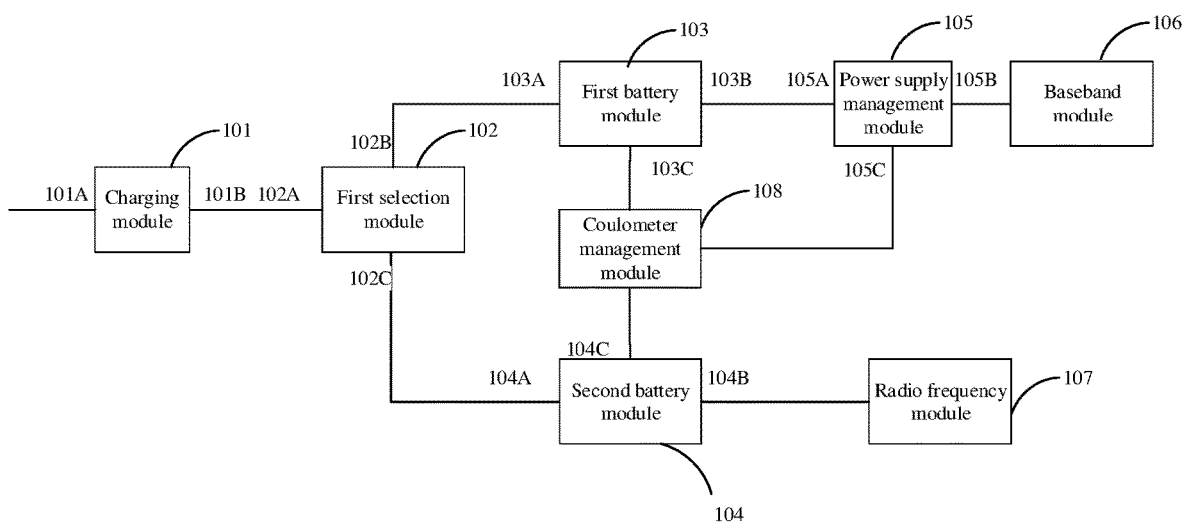
FIG. 2 is a second structural diagram of a charging apparatus according to an embodiment of the present disclosure.

As shown in FIG. 2, the apparatus further includes a power supply management module 105.

A second terminal 103B of the first battery module 103 is connected to a first terminal 105A of the power supply management module 105, and a second terminal 105B of the power supply management module 105 is connected to a baseband module 106; a third terminal 103C of the first battery module 103 is connected to a third terminal 105C of the power supply management module 105 via the coulometer management module 108; a third terminal 104C of the second battery module 104 is connected to the third terminal 105C of the power supply management module 105 via the coulometer management module 108; a second terminal 104B of the second battery module 104 is connected to a radio frequency module 107; and a third terminal 104C of the second battery module 104 is connected to the third terminal 105C of the power supply management module 105 via the coulometer management module 108.

In FIG. 2, the charging module charges the first battery module or the second battery module based on a case of connection of the first selection module. The first battery module supplies power to the power supply management module and provides a battery level value, and supplies power to the baseband module. The second battery module provides a battery level value of the second battery module to the power supply management module, and supplies power to the radio frequency module. The power supply management module sends the obtained battery level value to the baseband module, and the baseband module generates a control signal for controlling the connection of the first selection module.

In FIG. 2, the first battery module supplies power to the power supply management module and the baseband module. The battery level values of the first battery module and the second battery module are acquired by the coulometer management module and then sent to the power supply management module.

Figure 3:
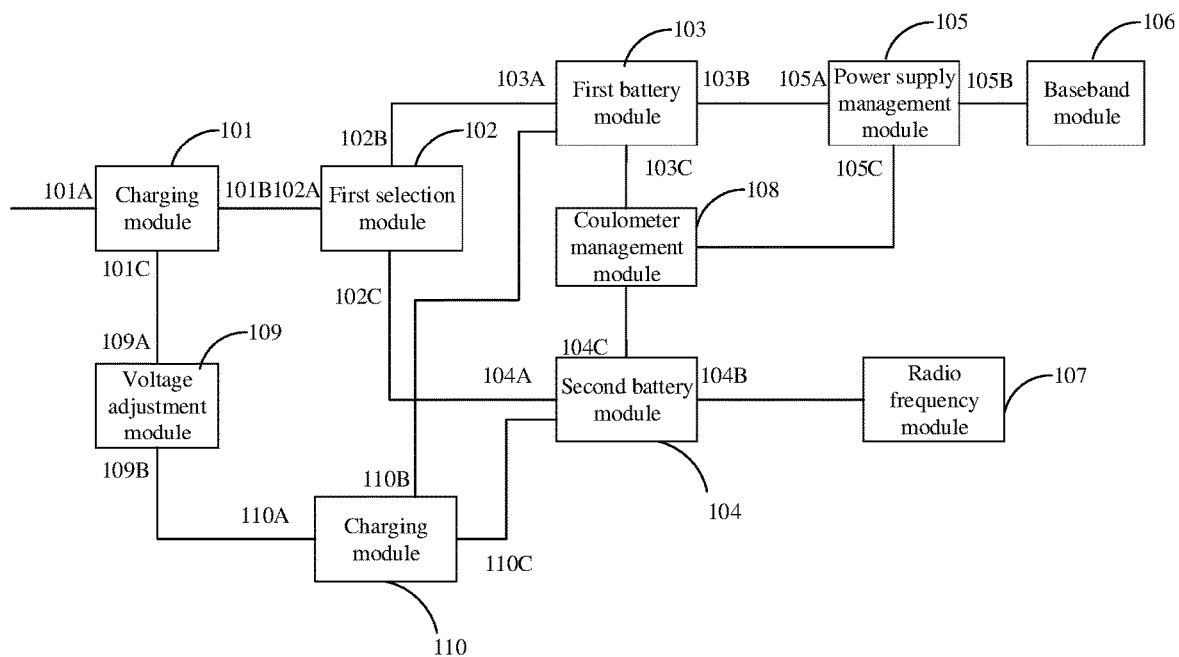
FIG. 3 is a third structural diagram of a charging apparatus according to an embodiment of the present disclosure.

Optionally, to implement mutual charging between the two battery modules and lengthen a time for using the terminal device, as shown in FIG. 3, the apparatus may further include a voltage adjustment module 109 and a second selection module 110.

A first terminal 109A of the voltage adjustment module 109 is connected to a third terminal 101C of the charging module 101; a second terminal 109B of the voltage adjustment module 109 is connected to a first terminal 110A of the second selection module 110; a second terminal 110B of the second selection module 110 is connected to the first terminal 103A of the first battery module 103, and a third terminal 110C of the second selection module 110 is connected to the first terminal 104A of the second battery module 104; and in a case in which a third condition is satisfied, the first terminal of the second selection module is connected to the second terminal of the second selection module, and in a case in which a fourth condition is satisfied, the first terminal of the second selection module is connected to the third terminal of the second selection module.

The third condition is that the second selection module receives a control signal from the power supply management module, and the fourth condition is that the second selection module receives a control signal from the power supply management module. The two control signals are different control signals or represent different meanings.

Figure 4:
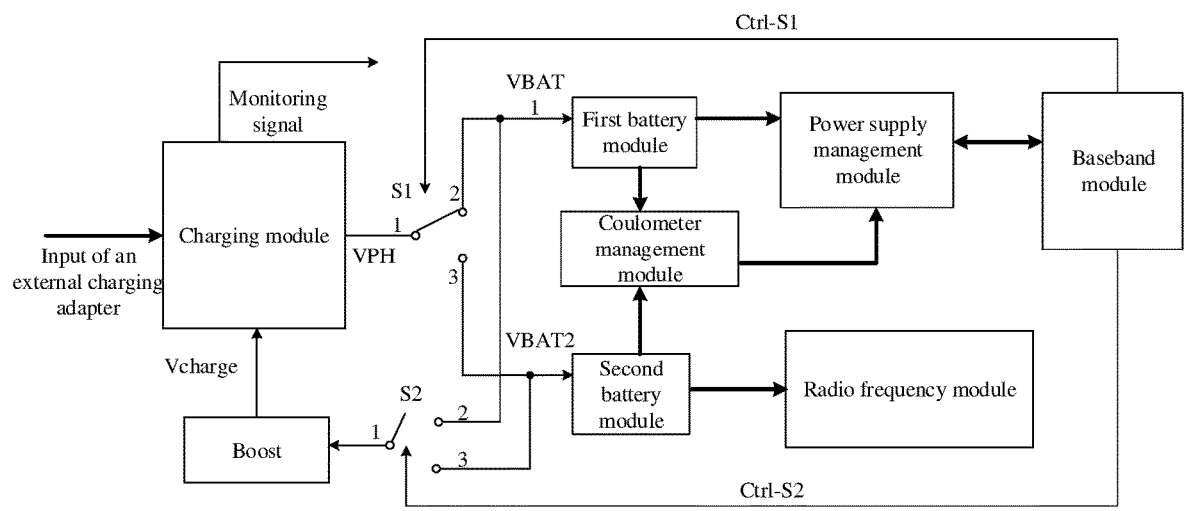
FIG. 4 is a fourth structural diagram of a charging apparatus according to an embodiment of the present disclosure.

With reference to FIG. 4, the charging module may be a battery charging chip, used to receive an input of an external charging adapter (for example, a 5V/2 A charger) and convert the input to a charging voltage (for example, limited to a voltage of 4.35V for charging a lithium battery) for a battery module by using a buck (step-down converter circuit) circuit inside the charging module. The charging module may also receive an output of the voltage adjustment module (Boost), and convert the output to a charging voltage for a lithium battery by using the buck circuit inside the charging module. The charging module may further send a monitoring signal to the power supply management module, to determine a charging status and the like.

In this embodiment of the present disclosure, the voltage adjustment module is a boost-buck circuit, where the circuit outputs 5V by default. The voltage adjustment module is a boost-buck circuit module, receives an input of the first battery module or the second battery module, converts the input to an output of 5V to the charging module by using a boost circuit inside the voltage adjustment module, and converts the output to a charging voltage for the second battery module or the first battery module by using the buck circuit inside the charging module.

The coulometer management module is configured to: acquire and calculate with information about battery levels of the first battery module and the second battery module, and then output the information to the power supply management module.

The coulometer management module may include two voltage analog-to-digital converters (ADCs) and a microprogrammed control unit (MCU). One ADC may collect voltage and current of a battery module, and send the voltage and current of the battery module to the MCU. The MCU may calculate the voltage and current of the battery module to obtain the power information of the battery module, and the MCU may output the power information of the battery module to the power supply management module. For example, the coulometer management module includes ADC 1 and ADC 2. After the ADC 1 collects voltage and current of the first battery module, ADC 1 may send the voltage and current of the first battery module to MUC. And MCU may calculate the voltage and current of the first battery module to obtain power information of the first battery module, and output the power information of the first battery module to the power supply management module.

The power supply management module may be a power supply and management chip. The coulometer management module obtains the information about the battery levels of the first battery module and the second battery module, and synchronously shares the information with the baseband module. Then the baseband module performs analysis and processing, to generate a control signal, to separately control the first selection module and the second selection module.

In this embodiment of the present disclosure, the first selection module or the second selection module may be a switch. As shown in FIG. 4, the first selection module is a switch S1, and the second selection module is a switch S2. The first selection module is configured to select the first battery module or the second battery module for charging, and the second selection module is configured to select the first battery module or the second battery module for an input into the voltage adjustment module.

The first battery module is configured to supply power to the baseband module (for example, a power supply management chip or a baseband chip), and the second battery module is configured to supply power only to the radio frequency module (for example, a 2G/3G/4G/5G power amplifier (PA)).

In a circuit structure shown in FIG. 4, the power supply management module controls the switch S1 and the switch S2 separately by using control signals Ctrl-S1 and Ctrl-S2. Control logic of the control signals Ctrl-S1 and Ctrl-S2 is shown in Table 1 and Table 2.

TABLE 1

| Logical value | | Electronic switch S1 | Function description |
|---|---|---|---|
| Ctrl-S1 | 0 | 1 and 2 of the switch S1 closed | The charging module charges the first battery module |
| | 1 | 1 and 3 of the switch S1 closed | The charging module charges the second battery module |

TABLE 2

| Logical value | | Electronic switch S2 | Function description |
|---|---|---|---|
| Ctrl-S2 | 0 | 1 and 2 of the switch S2 closed | The first battery module is used for an input into the voltage adjustment module |
| | 1 | 1 and 3 of the switch S2 closed | The second battery module is used for an input into the voltage adjustment module |

In this embodiment of the present disclosure, the baseband module and the radio frequency module use the first battery module and the second battery module respectively for charging, and therefore, a capacitor noise can be prevented. Therefore, the embodiments of the present disclosure can improve a sound quality of a terminal device.

With reference to the circuit structure shown in FIG. 4, the following describes a principle of the charging method. In the embodiments of the present disclosure, dual battery charging is "alternate charging", and an implementation process is as follows:

The charging module detects and identifies a plugged-in external power supply adapter, and because 1 and 2 are closed by default in the switch S1, the first battery module is preferably charged. The baseband module works, a system runs first, and the terminal device is started and a screen is lightened. After the terminal device is started, the baseband module receives an initial battery level value H1 and H2 of the first battery module and the second battery module sent by the power supply management module.

Then, the external adapter keeps charging the first battery module. When the baseband module receives that the battery level of the first battery module increases from H1 to H1+$\Delta 1$ (where $\Delta 1$ is an addition value of the battery level of the first battery module), the baseband module controls the signal Ctrl-S1 to output at a high level as "1". Then, 1 and 2 of the switch S1 are open, and 1 and 3 are closed. Then, a charging loop is switched to charge the second battery module.

Then, the external adapter keeps charging the second battery module. When the baseband module receives that the battery level of the second battery module increases from H2 to H2+$\Delta 2$ (where $\Delta 2$ is an addition value of the battery level of the second battery module), the baseband module controls the signal Ctrl-S2 to output at a low level as "0". 1 and 3 of the switch S1 are open, and 1 and 2 are closed. Then, the charging loop is switched to charge the first battery module again.

By analogy, when the baseband module detects that there is an increase of $\Delta 1$ in a battery level value of the first battery module after charging compared with a battery level value recorded last time, it is switched to charge the second battery module; just as the same, when the baseband module detects that there is an increase of $\Delta 1$ in a battery level value of the second battery module after charging compared with a battery level value recorded last time, it is switched to charge the first battery module. That is, the first battery module and the second battery module in the system implement alternate charging based on a change of battery levels, thereby effectively avoiding a problem that the second battery module has no power.

Values of $\Delta 1$ and $\Delta 2$ may be fixed, for example, 5%. Alternatively, the values may change. For example, a battery level is low as 5% at first, as the battery level increases, it may be 10%, 15%, 20%, and so on. In this way, less switching in a constant-current charging area may improve a charging efficiency.

When there is an input from the external charging adapter, the first battery module and the second battery module may be alternately charged by using a charging chip. When there is no input from the external charging adapter, the first battery module and the second battery module are in power consumption. Due to a difference in power consumption in working modules of the first battery module and the second battery module, a battery level of the first battery module may go down fast, but a battery level of the second battery module may have little change; or a battery level of the second battery module may go down fast, but a battery level of the first battery module may have little change. This causes a problem that one battery has sufficient power, but the other battery has a low battery level. There is further a problem that one module can work, but the other module cannot work. Therefore, in the embodiments of the present disclosure, mutual charging between the first battery module and the second battery module can be implemented to avoid an excessively great difference in battery level values of the first battery module and the second battery module. Related implementation descriptions are as follows.

In a non-battery-charging mode, the baseband module obtains a battery level value E1 of the first battery module, and obtains a battery level value E2 of the second battery module. At the same time, a difference in the battery level values of the first battery module and the second battery module is denoted as Δ0. Herein, a battery level value E0 for enabling charging between the batteries is set in advance.

When E1<E0, and E2−E1>Δ0, the baseband module controls the signal Ctrl-S1 to output at a low level of "0", where 1 and 2 of the switch S1 are closed, and synchronously controls the signal Ctrl-S2 to output at a high level of "1", where 1 and 3 of the switch S2 are closed. In this way, the second battery module (VBAT2) is used for an input into the voltage adjustment module. After internal boost of the voltage adjustment module, a 5V voltage Vcharge is output to the charging module, and the charging module charges the first battery module by using the switch S1.

When E2<E0, and E1−E2>Δ0, the baseband module controls the signal Ctrl-S1 to output at a high level of "1", where 1 and 3 of the switch S1 are closed, and synchronously controls the signal Ctrl-S2 to output at a low level of "0", where 1 and 2 of the switch S2 are closed. In this way, the first battery module (VBAT1) is used for an input into the voltage adjustment module. After internal boost of the voltage adjustment module, a 5V voltage Vcharge is output to the charging module. The charging module charges the second battery module by using S1.

To avoid frequent switching of charging between the batteries, generally, a value of E0 is less than 10%, and a value of Δ0 is greater than 15%. Values of the foregoing parameters may be optimized based on an engineering simulation test.

It can be learned from the foregoing descriptions that in this embodiment of the present disclosure, the baseband module and the radio frequency module supply power separately, which can solve a problem of capacitor noise generated from emission of a radio frequency PA, and can also avoid a problem of lowered sensitivity of the radio frequency module for receiving due to power supply of the baseband module. In addition, a loop for mutual charging between two batteries is used in this embodiment of the present disclosure, so that a problem that one battery has sufficient power but the other battery has a low battery level can be prevented.

Figure 5:
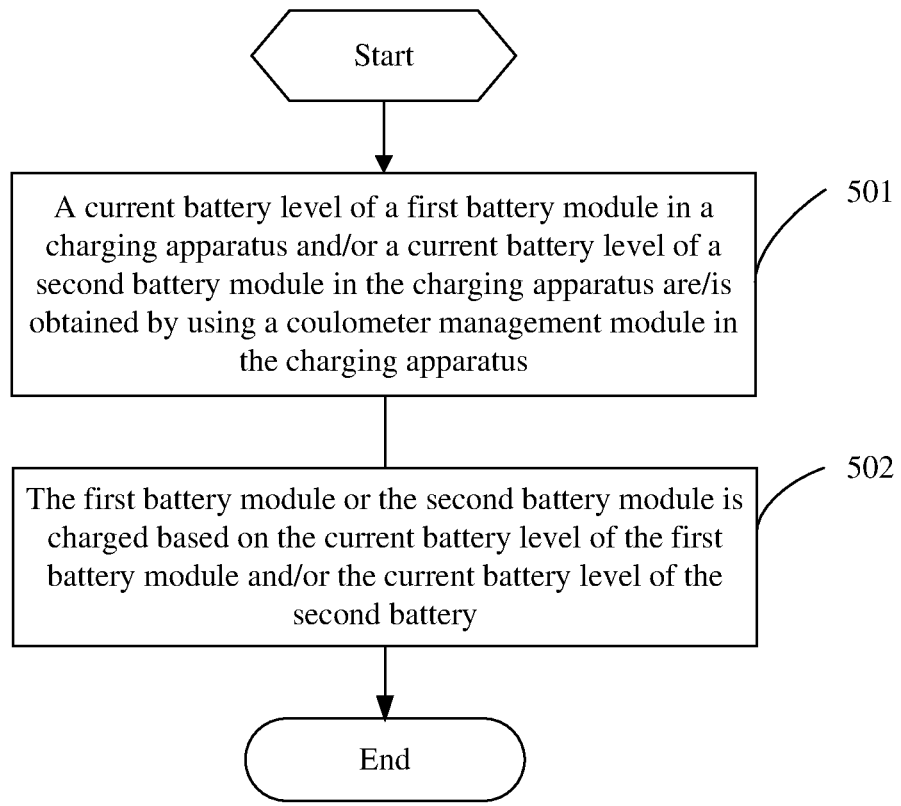
FIG. 5 is a flowchart of a charging method according to an embodiment of the present disclosure.

Refer to FIG. 5. FIG. 5 is a flowchart of a charging method according to an embodiment of the present disclosure, which can be applied to the foregoing charging apparatus. As shown in FIG. 5, the method includes the following steps.

Step 501: A current battery level of a first battery module in the charging apparatus and/or a current battery level of a second battery module in the charging apparatus are/is obtained by using a coulometer management module in the charging apparatus.

Step 502: The first battery module or the second battery module is charged based on the current battery level of the first battery module and/or the current battery level of the second battery module.

Optionally, this step may include:

Step S1: A charging module charges the first battery module.

Step S2: A baseband module controls the charging module to charge the second battery module in a case in which a battery level of the first battery module does not reach a specified battery level of the first battery module.

The step may be as follows: The baseband module sends, when the baseband module determines that an additional battery level value of the first battery module is a first preset value, a first control signal to a first selection module based on the current battery level of the first battery module, so that a first terminal of the first selection module is connected to a third terminal of the first selection module.

The first preset value may be configured as any value. Alternatively, the first preset value is a preset value corresponding to the current battery level of the first battery module.

Step S3: A baseband module controls the charging module to charge the first battery module in a case in which a battery level of the second battery module does not reach a specified battery level of the second battery module.

The step may be as follows: The baseband module sends, when the baseband module determines that an additional battery level value of the second battery module is a second preset value, a second control signal to the first selection module based on the current battery level of the second battery module, so that the first terminal of the first selection module is connected to a second terminal of the first selection module.

The second preset value may be configured as any value. Alternatively, the second preset value is a preset value corresponding to the current battery level of the second battery module.

Steps S2 and S3 are performed repeatedly, till at least one of following conditions is satisfied:

the battery level of the first battery module satisfies a first preset requirement, or the battery level of the second battery module satisfies a second preset requirement.

The preset requirement may be that a battery level reaches a preset value or fully charging.

In this embodiment of the present disclosure, the charging method may be applied to a terminal device such as a mobile phone, a tablet personal computer, a laptop computer, a personal digital assistant (PDA), a mobile Internet device (MID), or a wearable device.

In the embodiments of the present disclosure, the current battery level of the first battery module or the current battery level of the second battery module is obtained by using the coulometer management module. Then, the first battery module or the second battery module is charged based on the current battery level of the first battery module and/or the current battery level of the second battery module. Therefore, in the embodiments of the present disclosure, there is no need to wait for a fully charged battery before another battery can be charged, but the first battery module and the second battery module can be charged alternately. Therefore, the solution of the embodiments of the present disclosure can satisfy a requirement of a user on using a terminal device in time.

In addition, in this embodiment of the present disclosure, the baseband module and the radio frequency module use the first battery module and the second battery module respectively for charging, and therefore, a capacitor noise can be prevented. Therefore, the embodiments of the present disclosure can improve a sound quality of a terminal device.

On the basis of the foregoing embodiments, the solution of the embodiments of the present disclosure may further be used to achieve mutual charging between two battery modules. The following steps may be included:

in a case in which the external power supply is off, the baseband module controls the first battery module to charge the second battery module; or the baseband module controls the second battery module to charge the first battery module.

That the baseband module controls the first battery module to charge the second battery module includes:

in a case in which the current battery level of the second battery module is less than a third preset value, and a difference between the current battery level of the first battery module and the current battery level of the second battery module satisfies a third preset requirement, sending, by the baseband module, a third control signal to the first selection module, so that the first terminal of the first selection module is connected to the third terminal of the first selection module; and sending, by the baseband module, a fourth control signal to a second selection module, so that a first terminal of the second selection module is connected to a second terminal of the second selection module. A voltage adjustment module obtains a voltage from the first battery module, adjusts the voltage, and outputs an adjusted voltage to the charging module. The charging module uses the adjusted voltage to charge the second battery module.

The third preset value may be configured based on experience, and the third preset requirement may be, for example, a numerical value.

That the baseband module controls the second battery module to charge the first battery module includes:

in a case in which the current battery level of the first battery module is less than a fourth preset value, and a difference between the current battery level of the second battery module and the current battery level of the first battery module satisfies a fourth preset requirement, sending, by the baseband module, a fifth control signal to the first selection module, so that the first terminal of the first selection module is connected to the second terminal of the first selection module; and sending, by the baseband module, a sixth control signal to a second selection module, so that a first terminal of the second selection module is connected to a third terminal of the second selection module. Then, the voltage adjustment module obtains a voltage from the second battery module, adjusts the voltage, and outputs an adjusted voltage to the charging module. The charging module uses the adjusted voltage to charge the first battery module.

The fourth preset value may be configured based on experience, and the fourth preset requirement may be, for example, a numerical value.

In the solution, a problem that one battery has sufficient power but the other battery has a low battery level can be prevented, thereby prolonging a time of using a terminal device.

Figure 6:
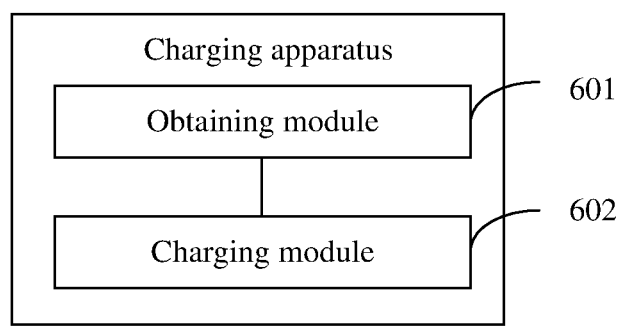
FIG. 6 is a fifth structural diagram of a charging apparatus according to an embodiment of the present disclosure.

Refer to FIG. 6. FIG. 6 is a schematic diagram of a charging apparatus according to an embodiment of the present disclosure. As shown in FIG. 6, the charging apparatus may include:

an obtaining module 601, configured to obtain a current battery level of a first battery module and/or a current battery level of a second battery module; a charging module 602, configured to charge the first battery module or the second battery module based on the current battery level of the first battery module and/or the current battery level of the second battery module.

Optionally, the charging module 602 may include a charging submodule, configured to charge the first battery module; and a first control submodule, configured to: control the charging submodule to charge the second battery module in a case in which a battery level of the first battery module does not reach a specified battery level of the first battery module; and control the charging submodule to charge the first battery module in a case in which a battery level of the second battery module does not reach a specified battery level of the second battery module, till at least one of following conditions is satisfied:

the battery level of the first battery module satisfies a first preset requirement, or the battery level of the second battery module satisfies a second preset requirement.

Optionally, the first control submodule may be configured to send, when determining that an additional battery level value of the first battery module is a first preset value, a first control signal based on the current battery level of the first battery module, where the first control signal is used to indicate the charging submodule to charge the second battery module. The first preset value is a preset value corresponding to the current battery level of the first battery module.

Optionally, the first control submodule may be configured to send, when determining that an additional battery level value of the second battery module is a second preset value, a second control signal based on the current battery level of the second battery module, where the first control signal is used to indicate the charging submodule to charge the first battery module. The second preset value is a preset value corresponding to the current battery level of the second battery module.

Optionally, the apparatus further includes:
a second control submodule, configured to: control the first battery module to charge the second battery module; or control the second battery module to charge the first battery module.

Optionally, the second control submodule includes:
a first control unit, configured to: in a case in which the current battery level of the second battery module is less than a third preset value, and a difference between the current battery level of the first battery module and the current battery level of the second battery module satisfies a third preset requirement, send a third control signal and a fourth control signal, where the third control signal is used to indicate the charging submodule to charge the second battery module, and the fourth control signal is used to indicate a first voltage adjustment unit to obtain a voltage from the first battery module.

The first voltage adjustment unit is configured to: obtain the voltage from the first battery module, adjust the voltage, and output an adjusted voltage to the charging module.

The charging submodule may be configured to use the adjusted voltage to charge the second battery module.

Optionally, the second control submodule includes:
a second control unit, configured to: in a case in which the current battery level of the first battery module is less than a fourth preset value, and a difference between the current battery level of the second battery module and the current battery level of the first battery module satisfies a fourth preset requirement, send a fifth control signal and a sixth control signal, where the fifth control information is used to indicate the charging submodule to charge the first battery module, and the sixth control signal is used to indicate a first voltage adjustment unit to obtain a voltage from the second battery module.

The second voltage adjustment unit is configured to: obtain the voltage from the second battery module, adjust the voltage, and output an adjusted voltage to the charging module.

The charging submodule may be configured to use the adjusted voltage to charge the first battery module.

For a principle of the apparatus in this embodiment of the present disclosure, refer to the descriptions in the method embodiment.

In the embodiments of the present disclosure, the current battery level of the first battery module or the current battery level of the second battery module is obtained by using the coulometer management module. Then, the first battery module or the second battery module is charged based on the current battery level of the first battery module and/or the current battery level of the second battery module. Therefore, in the embodiments of the present disclosure, there is no need to wait for a fully charged battery before another battery can be charged, but the first battery module and the second battery module can be charged alternately. Therefore, the solution of the embodiments of the present disclosure can satisfy a requirement of a user on using a terminal device in time.

In addition, an embodiment of the present disclosure further provides a terminal device. The terminal device includes the charging apparatus shown in any one of the foregoing embodiments.

Optionally, an embodiment of the present disclosure further provides a terminal device, including a processor, a memory, and a computer program stored in the memory and executable on the processor. When the computer program is executed by the processor, the processes of the charging method embodiment are implemented, and same technical effects are achieved. To avoid repetition, details are not provided herein again.

An embodiment of the present disclosure further provides a non-transitory computer-readable storage medium, where the non-transitory computer-readable storage medium stores a computer program. When the computer program is executed by a processor, the processes of the charging method embodiment are implemented, and same technical effects are achieved. To avoid repetition, details are not provided herein again. The non-transitory computer-readable storage medium may be, for example, a read-only memory (ROM), a random access memory (RAM), a magnetic disk, an optical disc.

It should be noted that in this specification, terms "include", "comprise" or any other variants thereof are intended to cover non-exclusive inclusion, so that a process, a method, an article or an apparatus that includes a series of elements not only includes those elements, but also includes other elements that are not explicitly listed, or includes inherent elements of the process, method, article, or apparatus. Without more restrictions, an element defined by the words "including a . . . " does not exclude presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the related technologies may be implemented in a form of a software product. The computer software product is stored in a storage medium (for example, a ROM/RAM, a magnetic disk, or a compact disc), and includes a plurality of instructions for instructing a terminal device (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. An alternately charging apparatus, applied to a terminal device and comprising:
   a charging module, wherein the charging module is connected to a first terminal of a first selection module, and a second terminal of the first selection module is connected to a first terminal of a first battery module, a third terminal of the first selection module is connected to a first terminal of a second battery module, in a case in which a first condition is satisfied, the first terminal of the first selection module is connected to the second terminal of the first selection module, and in a case in which a second condition is satisfied, the first terminal of the first selection module is connected to the third terminal of the first selection module; and
   a coulometer management module, connected to the first battery module and the second battery module;
   wherein the charging module is configured to alternately charge the first battery module or the second battery module.

2. The apparatus according to claim 1, further comprising: a power supply management module, wherein a first terminal of the power supply management module is connected to a second terminal of the first battery module, and a second terminal of the power supply management module is connected to a baseband module;
   a third terminal of the first battery module is connected to a third terminal of the power supply management module via the coulometer management module;
   a second terminal of the second battery module is connected to a radio frequency module; and
   a third terminal of the second battery module is connected to the third terminal of the power supply management module via the coulometer management module.

3. The apparatus according to claim 1, further comprising: a voltage adjustment module and a second selection module, wherein
   a first terminal of the voltage adjustment module is connected to a third terminal of the charging module;
   a second terminal of the voltage adjustment module is connected to a first terminal of the second selection module;
   a second terminal of the second selection module is connected to the first terminal of the first battery module, and a third terminal of the second selection module is connected to the first terminal of the second battery module; and in a case in which a third condition is satisfied, the first terminal of the second selection module is connected to the second terminal of the second selection module, and in a case in which a fourth condition is satisfied, the first terminal of the second selection module is connected to the third terminal of the second selection module.

4. An alternately charging method, applied to an alternately charging apparatus, wherein the alternately charging apparatus comprises:
 a charging module, wherein the charging module is connected to a first terminal of a first selection module, and a second terminal of the first selection module is connected to a first terminal of a first battery module, a third terminal of the first selection module is connected to a first terminal of a second battery module, in a case in which a first condition is satisfied, the first terminal of the first selection module is connected to the second terminal of the first selection module, and in a case in which a second condition is satisfied, the first terminal of the first selection module is connected to the third terminal of the first selection module; and
 a coulometer management module, connected to the first battery module and the second battery module; and
 the method comprises:
 obtaining a current battery level of a first battery module in the alternately charging apparatus and/or a current battery level of a second battery module in the alternately charging apparatus by using a coulometer management module in the alternately charging apparatus; and
 alternately charging the first battery module or the second battery module based on the current battery level of the first battery module and/or the current battery level of the second battery module.

5. The method according to claim 4, wherein the charging the first battery module or the second battery module comprises:
 step S1: charging the first battery module by using a charging module;
 step S2: controlling, by a baseband module, the charging module to charge the second battery module in a case in which a battery level of the first battery module does not reach a specified battery level of the first battery module;
 step S3: controlling, by the baseband module, the charging module to charge the first battery module in a case in which a battery level of the second battery module does not reach a specified battery level of the second battery module; and
 step S4: performing steps S2 and S3 repeatedly, till at least one of following conditions is satisfied:
 the battery level of the first battery module satisfies a first preset requirement, or the battery level of the second battery module satisfies a second preset requirement.

6. The method according to claim 5, wherein the controlling, by a baseband module, the charging module to charge the second battery module in a case in which a battery level of the first battery module does not reach a specified battery level of the first battery module comprises:
 sending, by the baseband module when determining that an additional battery level value of the first battery module is a first preset value, a first control signal to a first selection module based on the current battery level of the first battery module, so that a first terminal of the first selection module is connected to a third terminal of the first selection module.

7. The method according to claim 6, wherein the first preset value is a preset value corresponding to the current battery level of the first battery module.

8. The method according to claim 5, wherein the controlling, by the baseband module, the charging module to charge the first battery module in a case in which a battery level of the second battery module does not reach a specified battery level of the second battery module comprises:
 sending, by the baseband module when determining that an additional battery level value of the second battery module is a second preset value, a second control signal to a first selection module based on the current battery level of the second battery module, so that the first terminal of the first selection module is connected to a second terminal of the first selection module.

9. The method according to claim 8, wherein the second preset value is a preset value corresponding to the current battery level of the second battery module.

10. The method according to claim 5, wherein after step S3, the method further comprises any of following steps:
 controlling, by the baseband module, the first battery module to charge the second battery module; and
 controlling, by the baseband module, the second battery module to charge the first battery module.

11. The method according to claim 10, wherein the controlling, by the baseband module, the first battery module to charge the second battery module comprises:
 in a case in which the current battery level of the second battery module is less than a third preset value, and a difference between the current battery level of the first battery module and the current battery level of the second battery module satisfies a third preset requirement, sending, by the baseband module, a third control signal to the first selection module, so that the first terminal of the first selection module is connected to the third terminal of the first selection module; and
 sending, by the baseband module, a fourth control signal to a second selection module, so that a first terminal of the second selection module is connected to a second terminal of the second selection module;
 obtaining, by a voltage adjustment module, a voltage from the first battery module, adjusting the voltage, and outputting an adjusted voltage to the charging module; and
 using, by the charging module, the adjusted voltage to charge the second battery module.

12. The method according to claim 10, wherein the controlling, by the baseband module, the second battery module to charge the first battery module comprises:
 in a case in which the current battery level of the first battery module is less than a fourth preset value, and a difference between the current battery level of the second battery module and the current battery level of the first battery module satisfies a fourth preset requirement, sending, by the baseband module, a fifth control signal to the first selection module, so that the first terminal of the first selection module is connected to the second terminal of the first selection module; and
 sending, by the baseband module, a sixth control signal to a second selection module, so that a first terminal of the second selection module is connected to a third terminal of the second selection module;
 obtaining, by a voltage adjustment module, a voltage from the second battery module, adjusting the voltage, and outputting an adjusted voltage to the charging module; and using, by the charging module, the adjusted voltage to charge the first battery module.

13. An alternately charging terminal device, comprising an alternately charging apparatus, wherein the alternately charging apparatus comprises:
   a charging module, wherein the charging module is connected to a first terminal of a first selection module, and
   a second terminal of the first selection module is connected to a first terminal of a first battery module, a third terminal of the first selection module is connected to a first terminal of a second battery module, in a case in which a first condition is satisfied, the first terminal of the first selection module is connected to the second terminal of the first selection module, and in a case in which a second condition is satisfied, the first terminal of the first selection module is connected to the third terminal of the first selection module; and
   a coulometer management module, connected to the first battery module and the second battery module; and
   the terminal device further comprises a processor, a memory, and a computer program stored in the memory and executable on the processor, wherein the computer program, when executed by the processor, causes the terminal device to perform:
   obtaining a current battery level of a first battery module in the alternately charging apparatus and/or a current battery level of a second battery module in the alternately charging apparatus by using a coulometer management module in the alternately charging apparatus; and
   alternately charging the first battery module or the second battery module based on the current battery level of the first battery module and/or the current battery level of the second battery module.

14. The alternately charging terminal device according to claim 13, wherein the computer program, when executed by the processor, causes the terminal device to perform:
   step S1: charging the first battery module by using a charging module;
   step S2: controlling, by a baseband module, the charging module to charge the second battery module in a case in which a battery level of the first battery module does not reach a specified battery level of the first battery module;
   step S3: controlling, by the baseband module, the charging module to charge the first battery module in a case in which a battery level of the second battery module does not reach a specified battery level of the second battery module; and
   step S4: performing steps S2 and S3 repeatedly, till at least one of following conditions is satisfied:
   the battery level of the first battery module satisfies a first preset requirement, or the battery level of the second battery module satisfies a second preset requirement.

15. The alternately charging terminal device according to claim 14, wherein the computer program, when executed by the processor, causes the terminal device to perform:
   sending, by the baseband module when determining that an additional battery level value of the first battery module is a first preset value, a first control signal to a first selection module based on the current battery level of the first battery module, so that a first terminal of the first selection module is connected to a third terminal of the first selection module.

16. The alternately charging terminal device according to claim 15, wherein the first preset value is a preset value corresponding to the current battery level of the first battery module.

17. The alternately charging terminal device according to claim 13, wherein the computer program, when executed by the processor, causes the terminal device to perform:
   sending, by the baseband module when determining that an additional battery level value of the second battery module is a second preset value, a second control signal to a first selection module based on the current battery level of the second battery module, so that the first terminal of the first selection module is connected to a second terminal of the first selection module.

18. The alternately charging terminal device according to claim 17, wherein the second preset value is a preset value corresponding to the current battery level of the second battery module.

19. The alternately charging terminal device according to claim 13, wherein the computer program, when executed by the processor, causes the terminal device to further perform any of following steps:
   controlling, by the baseband module, the first battery module to charge the second battery module; and
   controlling, by the baseband module, the second battery module to charge the first battery module.

20. The alternately charging terminal device according to claim 19, wherein the computer program, when executed by the processor, causes the terminal device to perform:
   in a case in which the current battery level of the second battery module is less than a third preset value, and a difference between the current battery level of the first battery module and the current battery level of the second battery module satisfies a third preset requirement, sending, by the baseband module, a third control signal to the first selection module, so that the first terminal of the first selection module is connected to the third terminal of the first selection module; and
   sending, by the baseband module, a fourth control signal to a second selection module, so that a first terminal of the second selection module is connected to a second terminal of the second selection module;
   obtaining, by a voltage adjustment module, a voltage from the first battery module, adjusting the voltage, and outputting an adjusted voltage to the charging module; and
   using, by the charging module, the adjusted voltage to charge the second battery module; or
   in a case in which the current battery level of the first battery module is less than a fourth preset value, and a difference between the current battery level of the second battery module and the current battery level of the first battery module satisfies a fourth preset requirement, sending, by the baseband module, a fifth control signal to the first selection module, so that the first terminal of the first selection module is connected to the second terminal of the first selection module; and
   sending, by the baseband module, a sixth control signal to a second selection module, so that a first terminal of the second selection module is connected to a third terminal of the second selection module;
   obtaining, by a voltage adjustment module, a voltage from the second battery module, adjusting the voltage, and outputting an adjusted voltage to the charging module; and using, by the charging module, the adjusted voltage to charge the first battery module.

\* \* \* \* \*